Oct. 14, 1969  W. FÖRSTE ET AL  3,473,063
CARBON COMMUTATORS
Filed April 5, 1968  2 Sheets-Sheet 1
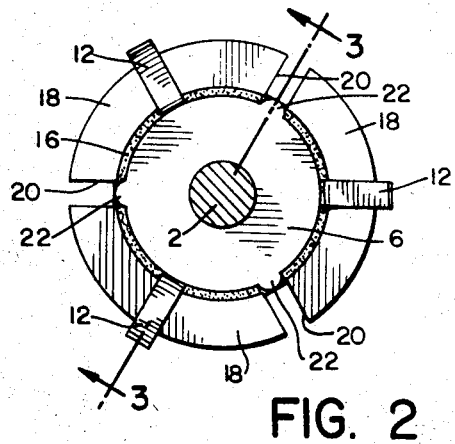
FIG. 1
FIG. 2
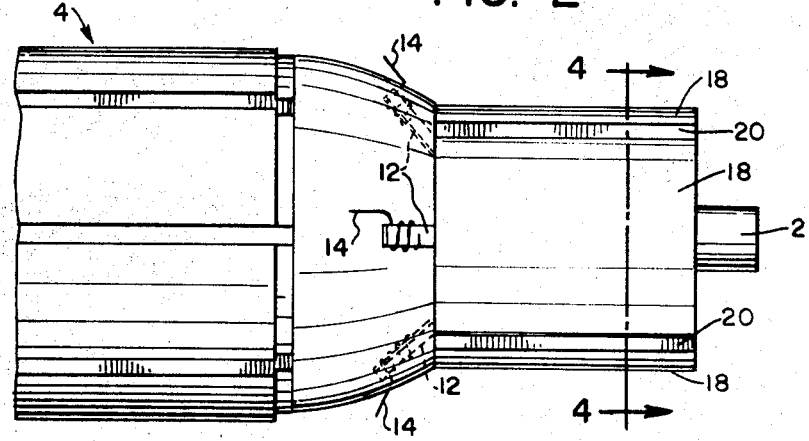
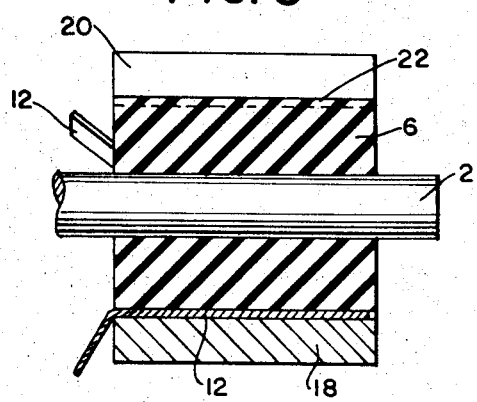
FIG. 3
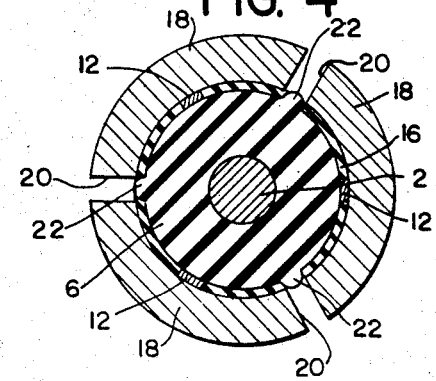
FIG. 4
INVENTORS
WALTER FÖRSTE et al
BY
AGENT INVENTORS
WALTER FÖRSTE et al

BY
AGENT

United States Patent Office 3,473,063
Patented Oct. 14, 1969

3,473,063
CARBON COMMUTATORS
Walter Förste, Suhl, Thuringia, and Gottfried Ostermay, Berlin, Germany, assignors to VB Elektrogerate, Berlin, Germany
Filed Apr. 5, 1968, Ser. No. 719,071
Int. Cl. H02k 1/10, 3/16, 3/20
U.S. Cl. 310—234                    7 Claims

ABSTRACT OF THE DISCLOSURE

Carbon commutators for small electric motors, having an initially non-slotted carbon casing and an elongated supporting member therein, the electrical connecting elements for the armature windings being axially disposed between the casing and the member. A preferably hardenable and electrically conductive resin compound is provided in the casing for securing the same to the member and for immobilizing the connecting elements.

---

The invention relates to carbon commutators for establishing contact connections between the armature winding wires and the lamellae or segments of carbon commutators in small electric motors.

The state of the art features carbon commutators for small and very small machines or motors whose segments are made individually and are provided with slots or boreholes for receiving the wires. The contact connection between the wires and the commutator proper is established here after the latter has been assembled, and this is done by running the winding wires through the slots in the segments; afterward, the wires are corrugated or coiled and they are then run back into these slots or boreholes. In order to avoid tensions or wedging effects, the wires are attached in the slots by means of electrically conductive and hardening compounds or putties and the like.

One disadvantage here is that the electrical or mechanical connections between the wires and the segments, specially designed for this purpose, are established in several work operations; in other words, this is a time-consuming and expensive method.

It is one of the main objects of this invention to reduce the time-consuming and expensive operations for the establishment of an electrical and mechanical connection between the winding wires and the segments or lamellae.

It is an object of the invention to create a durable, advantageously established combined electrical and mechanical connection by means of a suitable production-engineering method used in making the commutator body proper.

The invention, according to its major features, solves the problem as follows: A supporting member made of a suitable insulating material is arranged on the armature shaft; it is provided with technical means, for example, ribs or a flange, for centering a cylindrical carbon casing. The bared winding wires are distributed in axial symmetry around the circumference, between the supporting member and the casing, and they are attached with an electrically conductive, hardenable resin. The remaining spaces are simultaneously filled with this resin.

After the resin has hardened, the carbon casing is slotted radially with respect to the axis of the supporting member and the resin is preferably also slotted to the outer surface of the supporting member, thereby producing the segments or lamellae.

In assembling commutators according to this invention, there is a major advantage in that the carbon casing can be attached to the supporting member, and the winding wires can be connected to the casing, in a single operation. The wires being covered with a resin, their surfaces are protected against oxidation so that contact resistance is kept low.

Other important features of the invention will become apparent from the specification. Objects, attendant advantages and further details of the invention will be readily appreciated as the same becomes better understood by reference to the following detailed description, when considered with the accompanying drawings, wherein FIG. 1 is a view of a three-segment commutator made according to the present invention;

FIG. 2 is a side view of the commutator of FIG. 1, together with parts of the associated armature;

FIG. 3 is a longitudinal sectional view taken along line 3—3 of FIG. 1;

FIG. 4 is a transversal sectional view taken along line 4—4 of FIG. 2;

Figure 5:
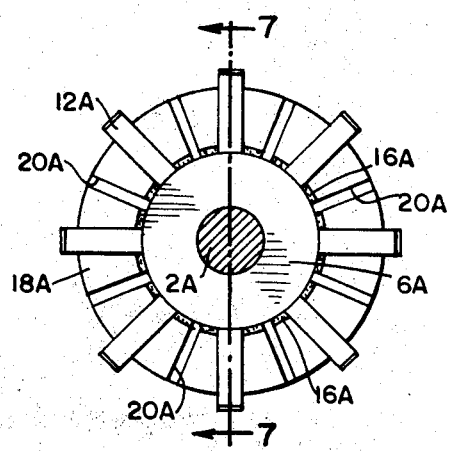
FIG. 5 is a view similar to that of FIG. 1 but of an 8-segment commutator according to the present invention.

As a matter of example, a three-segment commutator is shown and described with respect to FIGS. 1 to 4, relating to a first exemplary embodiment, although, it will be understood, the principles apply to other numbers of segments, slots therebetween and appropriate connecting wires for the armature windings. The latter will not be described or illustrated since it is well known to those skilled in the art. An 8-segment alternative will be described later with respect to the remaining FIGS. 5 to 8.

Once the armature assembly has been assembled, it is pushed over and attached in the conventional manner on a shaft 2. No details being described, the armature is generally designated by numeral 4. It may of course be treated or immersed in lacquer in the usual manner. At the point of the shaft 2 where the commutator should be provided a substantially cylindrical supporting member 6 is attached, as best shown in FIG. 3. The member is preferably made from an insulating plastic material. On its surface the member 6 is provided with axial ribs 22, as visible in FIGS. 1 and 4, corresponding in number to the segments or lamellae.

A non-slotted carbon cylinder or casing is pushed over the supporting member 6, as shown in FIG. 3; it is substantially centered by the ribs 22. The lengths of these elements are substantially the same. Numerals 18 and 20, to be described later in detail, apply to the carbon casing. The spaces between the casing and the member 6 and its ribs is filled up with a preferably electrically conductive, preferably hardenable resin compound shown at 16; such a compound can be heat-treated and hardened, or otherwise solidified, so as to lend a certain degree of stability to the assembly, as will be explained in more detail.

In the afore-mentioned spaces, winding connecting elements 12 or 14 are axially inserted, the former constituting metal foils or strips while the latter may be wires which can be soldered or otherwise attached with their ends to the strips 12, as indicated in FIG. 2. It will be understood that either the strips 12 or the wires 14 themselves can be inserted in the spaces between the casing and the member 6.

The subassembly is then hardened, and then the casing is longitudinally slotted, in a direction radially toward the shaft 2, whereby segments or lamellae 18 are obtained, interspersed with a corresponding number of slots 20, as shown in FIGS. 1, 2 and 4. In the example shown in these figures, three segments are formed with three slots therebetween. The ribs 22 separate the conductive sections of the resin 16, as shown in FIG. 1, thereby providing the required insulation between the electric connections.

This construction has proven to be simple and efficient in production. Deviations of the measurements of the casing and the member are eliminated by the provision of the compound or resin poured into the spaces therebetween. It will be understood from the preceding description that the commutator can be manufactured in a cheap and expeditious manner, without resorting to multiple steps and using complicated jigs and the like. The contact between the armature-winding wires, or connecting strips, and the segments of the casing are both mechanically and electrically ensured by the provision of the conductive compound.

It is particularly advantageous that the attachment between the carbon casing and the supporting member, as well as that between the connecting elements and the embedding compound is accomplished in a single procedural step.

We are now coming to the 8-segment alternative of the invention, shown and described with respect to FIGS. 5 to 8, relating to a modified or second exemplary embodiment. Only those features which are different from the first embodiment will be explained in detail. It should be noted that FIGS. 5 to 8 substantially correspond in their showing to the respective preceding figures (namely, FIGS. 1 to 4) with the only difference that in FIG. 6 the armature assembly has been omitted for the sake of clarity.

Shaft 2 of the first embodiment has its counterpart in shaft 2A of FIGS. 5 to 8; similarly, elements 12A, 16A 18A and 20A are identical with or closely similar to the respective elements 12, 16, 18 and 20 described earlier.

Figure 6:
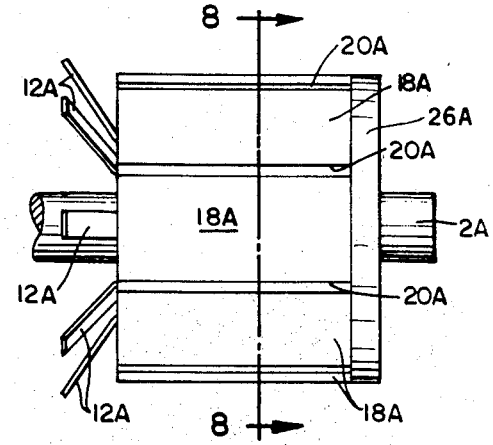
FIG. 6 is again a side view (the armature being omitted from this illustration) of the commutator of FIG. 5.
Figure 7:
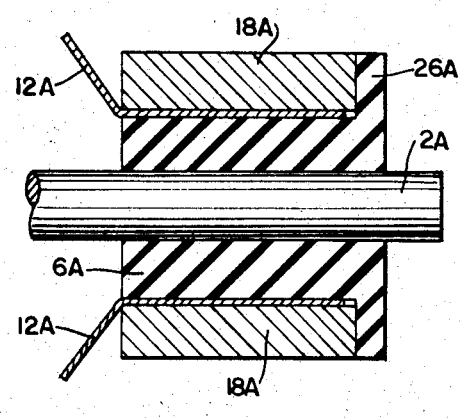
FIG. 7 is a longitudinal section view taken along line 7—7 of FIG. 5.

The manufacturing procedure is much like that by which the first embodiment is made. In the second embodiment, a supporting member 6A is provided which does not have the previously described ribs but has a terminal, flanged portion 26A as best shown in FIGS. 6 and 7. The casing is pushed over the member 6A so that it abuts against the portion 26A and is substantially centered thereon. It should be noted that the diameter of the non-slotted carbon cylinder or casing is larger than that of the center or main portion of the member 6A, the space therebetween being filled up with the compound or resin 16A.

The metal strips 12A or connecting wires 14A are axially embedded in the compound which again provides electrical connection to the respective segments 18A. In the modified or second embodiment, there are eight segments and a corresponding number of connecting elements 12A.

Figure 8:
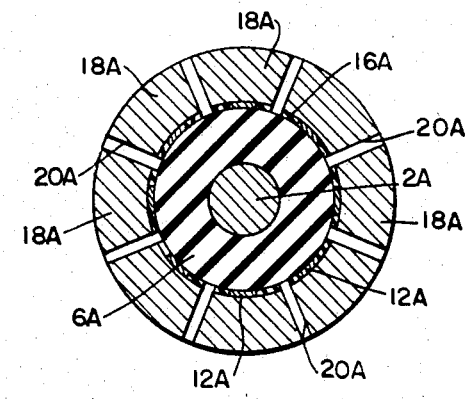
FIG. 8 is a transversal sectional view taken along line 8—8 of FIG. 6.

Here, again, the casing is longitudinally slotted once the subassembly is hardened. It should be noted however that in making the radially inwardly directed slots the compound or resin 16A is also slotted, as shown in FIGS. 5 and 8, all the way to the outer surface of the main portion of the member 6A.

The advantages of the second embodiment are similar to those of the first one, as explained hereinabove.

A similar invention is described in applicants' co-pending patent application Cer. No. 719,070, filed on the same day, and entitled "Carbon Commutator", describing alternative features which, however, can be combined with those disclosed and claimed herein.

It should be understood, of course, that the foregoing disclosure relates to preferred embodiments of the invention and its possible modifications and that it is intended to cover all changes and modifications of the examples described which do not constitute departures from the spirit and scope of the invention as set forth in the appended claims.

What we claim is:

1. A carbon commutator for small electric motors, the latter having an armature, windings thereon, electrical connecting elements for said windings, and a shaft for said armature; the commutator comprising an elongated supporting member concentrically disposed about said shaft; a cylindrical carbon casing surrounding said member; at least two of sail connecting elements being axially disposed between said casing and said member in a non-insulated manner; a corresponding number of slots being provided in said casing between adjacent pairs of said connecting elements so as to form commutator contact segments therein; and a compound between said casing and said member for securing said segments of the casing to said member and for immobilizing said connecting elements.

2. The carbon commutator as defined in claim 1, wherein said casing has at least three symmetrically disposed slots and segments, there being a corresponding number of said connecting elements, one each substantially midway between said slots.

3. The carbon commutator as defined in claim 1, wherein said connecting elements are metal strips leading at least partly to said windings.

4. The carbon commutator as defined in claim 1, wherein said connecting elements are wires constituting the ends of said windings.

5. The carbon commutator as defined in any one of claims 1 to 4, wherein said compound is an electrically conductive hardenable resin.

6. The carbon commutator as defined in claim 1, wherein said supporting member has axial outer ribs corresponding in number to that of said segments; said casing is centered about said ribs; said compound fills the spaces between said casing and said member as well as its ribs; and said slots are radially aligned with said ribs.

7. The carbon commutator as defined in claim 1, wherein said supporting member has a flanged terminal portion on its face turned away from said armature; said casing has a diameter larger than that of the main portion of said member and abuts axially against said flanged portion so as to be centered with respect thereto; said connecting elements are disposed in the space between said casing and said main portion of the member; said compound substantially fills up said space; and said slots also extend in said compound to the outer surface of said main portion of the member.

References Cited

UNITED STATES PATENTS

| | | | |
|---|---|---|---|
| 1,270,967 | 7/1918 | Mizer | 310—233 |
| 1,793,986 | 2/1931 | Apple | 310—233 X |
| 1,811,180 | 6/1931 | Landers | 310—237 |
| 2,306,028 | 12/1942 | Conradty et al. | 310—236 |
| 3,014,144 | 12/1961 | Fleischmann et al. | 310—237 |
| 3,103,060 | 9/1963 | Fay | 310—235 X |

MILTON O. HIRSHFIELD, Primary Examiner

D. F. DUGGAN, Assistant Examiner

U.S. Cl. X.R.

310—235

UNITED STATES PATENT OFFICE
CERTIFICATE OF CORRECTION

Patent No. 3,473,063

October 14, 1969

Walter Förste et al.

It is certified that error appears in the above identified patent and that said Letters Patent are hereby corrected as shown below:

In the heading to the printed specification, line 4, "VB Elektrogerate" should read -- VVB Elektrogerate --. Column 4, line 14, "sail" should read -- said --.

Signed and sealed this 5th day of January 1971.

(SEAL)
Attest:

Edward M. Fletcher, Jr.
Attesting Officer

WILLIAM E. SCHUYLER, JR.
Commissioner of Patents